United States Patent [19]
Dykes et al.

[11] Patent Number: 5,872,915
[45] Date of Patent: Feb. 16, 1999

[54] COMPUTER APPARATUS AND METHOD FOR PROVIDING SECURITY CHECKING FOR SOFTWARE APPLICATIONS ACCESSED VIA THE WORLD-WIDE WEB

[75] Inventors: Pernell James Dykes, Byron; Erik Duane Lindberg, Rochester, both of Minn.

[73] Assignee: International Business Machines Corporation, Armonk, N.Y.

[21] Appl. No.: 772,737

[22] Filed: Dec. 23, 1996

[51] Int. Cl.$^6$ .............................. G06F 17/30; G06F 13/14
[52] U.S. Cl. ................. 395/188.01; 395/187.01; 395/200.2
[58] Field of Search .................. 395/186, 187.01, 395/188.01, 200.2; 380/4, 21, 23, 25, 49

[56] References Cited

U.S. PATENT DOCUMENTS

| | | | |
|---|---|---|---|
| 5,586,260 | 12/1996 | Hu | 395/200.2 |
| 5,684,951 | 11/1997 | Goldman et al. | 395/188.01 |
| 5,689,638 | 11/1997 | Sadovsky | 395/188.01 |
| 5,706,427 | 1/1998 | Tabuki | 395/187.01 |
| 5,721,908 | 1/1998 | Lagarde et al. | 395/610 |

*Primary Examiner*—Robert W. Beausoliel, Jr.
*Assistant Examiner*—Ly V. Hua
*Attorney, Agent, or Firm*—Schmeiser, Olsen & Watts

[57] ABSTRACT

The preferred embodiment provides a computer system and method for providing secure access to a software application from a web browser over the WWW. The system and method allows a user of the web browser to access the software application after performing appropriate security checks. The user inputs data via the web browser, which is communicated to the web server application. The web server application then authenticates the web browser, and passes appropriate input data to an application gateway, including data to uniquely identify the web browser. The application gateway then uses authentication data received from the browser to determine whether the user of the browser is authorized to access the software application. According to the preferred embodiment, the browser authentication information is used to correlate the user to appropriate authentication information for the software application. The application gateway then uses this new authentication information to gain access to the software application. The application gateway then performs the function requested in the web server input data by formatting appropriate commands for the software application. The software application responds by outputting data to the application gateway that includes an identifier that the application gateway uses to match the output data with the web browser that requested the output data. This system thus allows numerous web browsers access to the software application simultaneously.

27 Claims, 7 Drawing Sheets

800

| APP2 | | | | |
|---|---|---|---|---|
| User ID | User Name | Password | Database Server | Database |
| User a | Joe Brown | Secret | CorpServer | CorpInfo |
| User b | | | | |
| User c | | | | |
| ... | | | | |
| User x | | | | |

FIG. 7

COMPUTER APPARATUS AND METHOD FOR PROVIDING SECURITY CHECKING FOR SOFTWARE APPLICATIONS ACCESSED VIA THE WORLD-WIDE WEB

RELATED APPLICATION

This application is related to the following U.S. patent applications: "Computer Apparatus and Method for Communicating Between Software Applications and Computers on the World-Wide Web Using Universal Variable Handling", Ser. No. 08/780,014, filed Dec. 23, 1996; "Computer Apparatus and Method for Communicating Between Software Applications and Computers on the World-Wide Web", Ser. No. 08/780,738, filed Dec. 23, 1996; "Computer Apparatus and Method Including a Disconnect Mechanism for Communicating Between Software Applications and Computers on the World-Wide Web", Ser. No. 08/772,738, filed Dec. 23, 1996; and "Computer Apparatus and Method for Providing a Common User Interface for Software Applications Accessed via the World-Wide Web", Ser. No. 08/780,015, filed Dec. 23, 1996.

BACKGROUND OF THE INVENTION

1. Technical Field

This invention generally relates to interactions on the world-wide web, and more specifically relates to an apparatus and method that allow a web user to interact with a software application on another computer system that is accessible via the world-wide web.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Computer systems typically include operating system software that control the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a software application running on one computer system.

One significant computer network that has recently become very popular is the Internet. The Internet grew out of the modem proliferation of computers and networks, and has evolved into a sophisticated worldwide network of computer systems linked together by web pages that collectively make up the "world-wide web", or WWW. A user at an individual PC (i.e., workstation) that wishes to access the WWW typically does so using a software application known as a web browser. A web browser makes a connection via the WWW to other computers known as web servers, and receives information from the web servers that is displayed on the user's workstation. Information displayed to the user is typically organized into pages that are constructed using a specialized language called Hypertext Markup Language (HTML).

As the WWW has experienced explosive growth in the last few years an ever increasing concern is web security. In particular, where web browsers and web servers are being used to provide web-based access to other computer resources (i.e., software applications, data files, HTML web pages, etc.) those resources must be kept secure. This involves assuring that access to those resources is granted only to approved web users.

In some cases, a system must be provided where different users are granted access to different resources accessible through the web server. For example, one web server may provide web access to two software applications, and each software application accesses multiple databases. Some users access one software application, but not the other, while other users access to both software applications, but only specified databases for those software applications. If a user is authorized to access one of the two software applications, and security checking is only performed at the web server level, gaining access to the user will grant access to both software applications even though the user is not authorized to access the second software application. Even if security checking is performed before granting access to each software application, granting access would allow the user to access any of the databases that are accessible to the software application. Thus, more sophisticated security checking techniques are needed to assure that unapproved users cannot gain access to sensitive resources while access for approved users is maintained.

Typical web security uses a password and userID combination to authenticate a particular web user to access a particular web server or specific resources through that web server. When a web user attempts to access such a protected resource, he is prompted to supply a userID and password. This is typically done by web server issuing a request that requires the web user to enter a userID and password, which is then stored by the web browser and transmitted back to the web server application.

This process is typically repeated for each specific resource that is accessible through the web server application. Thus, a web user that accesses several secure resources is prompted and required to enter his or her password and userIDs for each resource. For example, a user might have to enter his or her password and userID to gain access to a web server, a second password and userID to gain access to a software application through the web server and a third password and third userID to gain access to a particular software application database. This requires the user to memorize a large number of passwords and userIDs in addition to the inconvenience of having to submit them multiple times. Even if the password and userID are the same at each level, it becomes annoying to repetitively enter the same information again and again.

In traditional web server authentication systems, the web browser resends the password an userID each time a submission is sent to the web server. Thus, the password and userID repeatedly subjected to the risk of "snooping" (i.e., the unauthorized and unwanted interception of the transmissions between web server and web browser). Some systems try to limit this problem by regularly requiring the users to change their passwords and userID's, but this can be major problem where multiple passwords and multiple userID's are required to access multiple software applications.

The problems associated with the prior art solutions have lead some system operators to remove additional security protection measures and rely only on the web server authentication with a userID and password. Again, this solution is acceptable only where a high risk of unauthorized access to the web-accessible resources is acceptable. Without improved methods for security checking of web users, computer systems will remain less secure and will be inconvenient when used to access multiple secure resources via the World-Wide Web.

DISCLOSURE OF INVENTION

According to the present invention, a computer system and method for providing secure access to a software application from a web browser over the WWW is disclosed. In particular, the system provides secure access to multiple software applications or other computer resources without requiring the user to memorize multiple passwords and userID's. The system uses a library of users containing authentication data for the multiple software applications. Thus, the system is able to provide secure access to multiple software applications without requiring multiple passwords and/or repetitive password entry. The system includes one or more computers executing a web browser, a web server application, an application gateway, and a software application after performing appropriate security checks. The system and method allow a user of the web browser to access the software application. The user inputs data via the web browser, which is communicated to the web server application. Web server application then authenticates the web browser, and passes appropriate input data to an application gateway, including data to uniquely identify the web browser. The application gateway then uses authentication data received from the browser to determine whether the user of the browser is authorized to access the software application. According to the preferred embodiment, the browser authentication information is used to correlate the user to appropriate authentication information for the software application. The application gateway then uses this new authentication information to gain access (i.e., log on) to the software application. The application gateway then performs the function requested in the web server input data by formatting appropriate commands for the software application. The software application responds by outputting data to the application gateway that includes an identifier that the application gateway uses to match the output data with the web browser that requested the output data. This system thus allows numerous web browsers access to the software application simultaneously.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 7 is a schematic view of a portion of a user library.

BEST MODE FOR CARRYING OUT THE INVENTION

The present invention relates to transactions via the WWW. For those individuals who are not Internet or WWW experts, the Overview section below presents many of the concepts that will help to understand the invention.

OVERVIEW

Web Transactions

Figure 2:
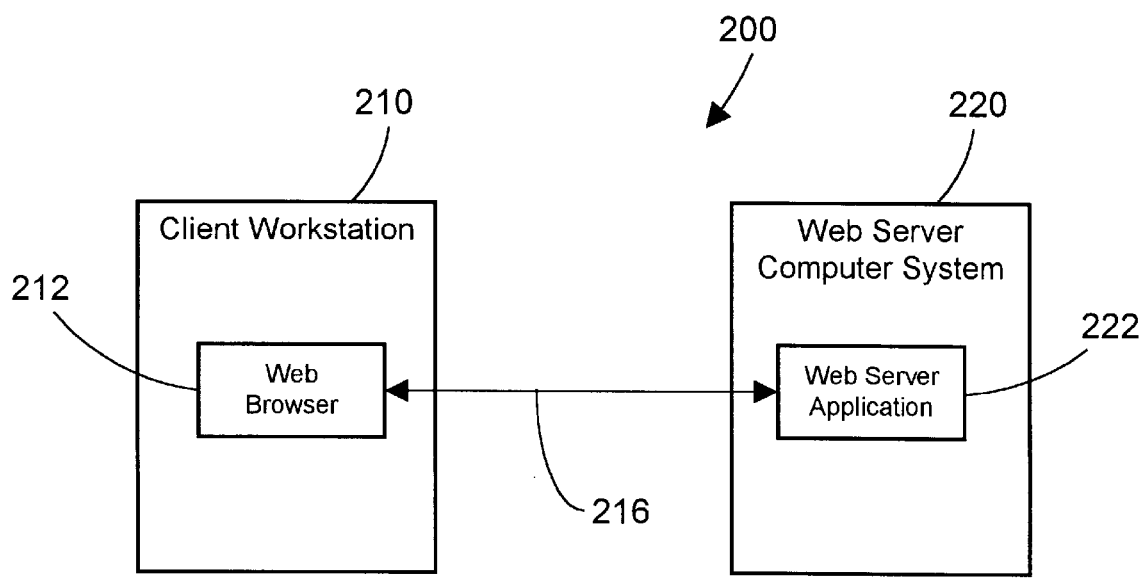
FIG. 2 is a block diagram of a transaction between a client workstation and a web server computer system.

Referring to FIG. 2, a typical transaction between a standard web browser 212 running on a client workstation 210 and a web server application 222 running on a web server computer system 220 occurs over a connection 216. Of course, client workstation 210 may be coupled to other computer systems via a local area network (LAN) or via any other type of computer network or other interconnection. Likewise, web server computer system 220 may be coupled to other computer systems as well. Client workstation 210 may be any computer that is capable of providing access to the WWW by using web browser 212. This would include handheld, portable or laptop computers, standard desktop computer systems, dumb terminals connected to a mainframe, etc.

Web browser 212 is a software program running on client workstation 210 that allows a user at client workstation 210 to communicate with other computers over connection 216. Web browser 212 would include any web browser which is capable of transmitting and receiving data over the WWW. This includes commercial software applications such as IBM's WebExplorer, Netscape Navigator, Microsoft Internet Explorer, Apple Computer's CyberDog, and any other software application which now exists or which may be developed in the future for accessing or processing information over the WWW. The preferred embodiment for connection 216 is any suitable connection to the Internet, including a hardwired connection, telephone access via a modem or high-speed Ti line, infrared or other wireless communications, computer network communications (whether over a wire or wireless), or any other suitable connection between computers, whether currently known or developed in the future.

It should be noted that client workstation 210 and web server computer system 220 may be the same physical and/or logical computer system. Web browser 212 typically displays pages of hyper-text markup language (HTML) data to a user at client workstation 210. Other types of data (besides HTML) may also be transmitted to web browser 212, including text data, graphical data (e.g., graphics image format (GIF) files), audio data (e.g., WAV files), Java applets (executable code) and a specialized data form known as multipurpose internet mail extensions (MME) data (which may include combinations of the foregoing and other data types).

Web server application 222 is a software program running on web server computer system 220 that allows a user at client workstation 210 to access information controlled by web server 220. Web server computer system 220 typically outputs pages of HTML data to WEB browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 may dynamically build output data (e.g., an HTML page) from parts that it retrieves from memory within web server computer system 220 or from other computer systems, or may simply pass through a page that has been constructed at an earlier time or by another computer.

Web browser 212 typically interacts with web server application 222 by transmitting input (e.g., a Uniform Resource Locator (URL) or an HTML page) over connection 216 to web server computer system 220. Web server computer system 220 running web server application 222 receives the input from web browser 212, and in response, outputs data (e.g., an HTML page) to browser 212. Web server computer system 220 may also have numerous other software components, including Common Gateway Interface (CGI) programs or modules, for performing desired functions. The process described above illustrates a basic transaction over the Internet, recognizing that many details and variations that are within the scope of the present invention are not disclosed herein for the purpose of providing a simple context for understanding the concepts of the present invention.

Web Pages

A web page is primarily visual data that is intended to be displayed on the monitor of client workstation 210. Web pages are generally written in Hypertext Markup Language (HTML). When web server application 222 running on web server computer system 220 receives a web page request, it will build a web page in HTML or retrieve a pre-built HTML file and send it off across connection 216 to the requesting web browser 212. Web browser 212 understands HTML and interprets it and outputs the web page to the monitor of client workstation 210. This web page displayed on the user's screen may contain text, graphics, and links (which are URL addresses of other web pages.) These other web pages (ire., those represented by links) may be on the same or on different web servers. The user can retrieve these other web pages by clicking on these links using a mouse or other pointing device. This entire system of web pages with links to other web pages on other servers across the world collectively comprise the "World-Wide Web" (WWW).

The remainder of this specification discloses how to use the invention to enable secure communication between a web user at client workstation 210 and resources such as software applications via the WWW, particularly in the context of work flow software.

DETAILED DESCRIPTION

Figure 1:
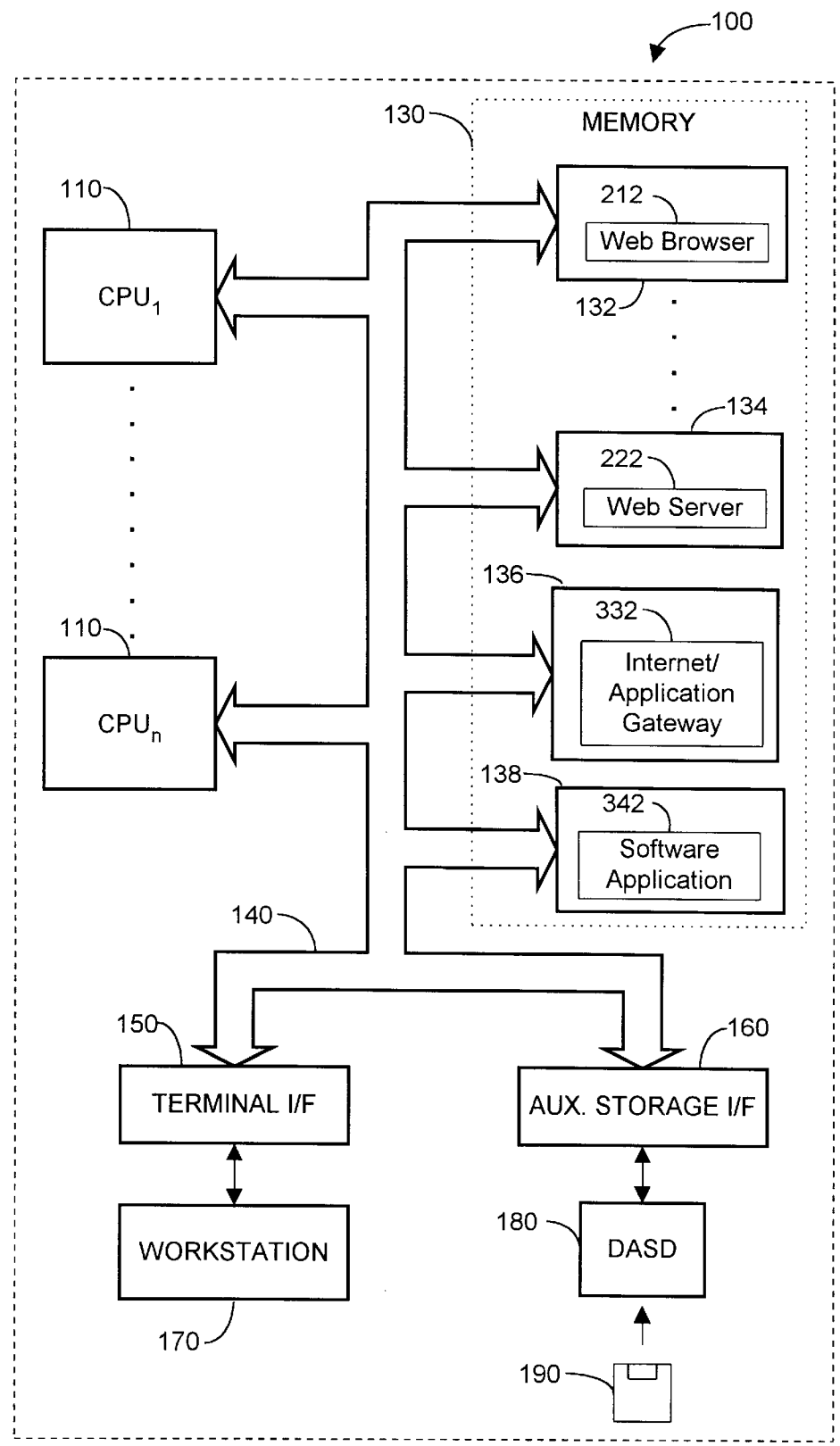
FIG. 1 is a block diagram of a preferred embodiment of the present invention.

Referring now to FIG. 1, a computer system in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a floppy disk 190; a bus 140; and a memory 130 which includes multiple locations for containing various software programs. In this example, memory 130 includes a web browser 212 running in location 132, a web server application 222 running in location 134, an Internet/application gateway program 332 running in location 136, and a software application 342 running in location 138.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, web browser 212 running in location 132 may be part of system 100's cache memory. In addition, memory 130 and CPUs 110 may be distributed across several different computer that collectively comprise system 100. For example, web browser 212 may reside on one computer with $CPU_1$, web server application 222 may reside on another computer system with a separate $CPU_2$, Internet/application gateway 332 may reside on a third computer system with a different $CPU_{n-1}$ and software application 342 may reside on a fourth computer with a different $CPU_n$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through programmable workstation 170. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. As shown in FIG. 1, DASD 180 may be a floppy disk drive which is capable of reading and writing programs or data on floppy disk 190. DASD 180 may also be any other type of DASD known to those skilled in the art. This would include CD-ROM drives, hard disk drives, optical drives, etc. Floppy disk 190 represents a typical 3.5 inch magnetic media disk known to those skilled in the art.

Figure 3:
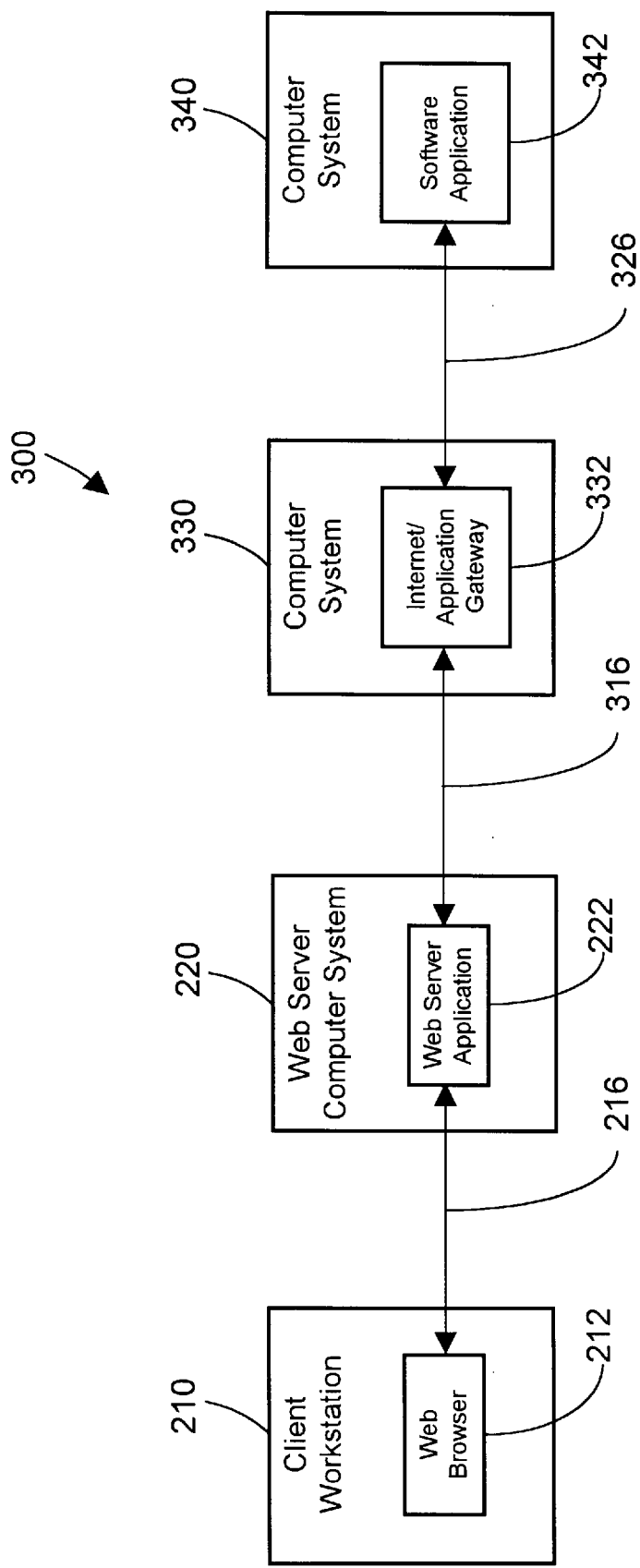
FIG. 3 is a block diagram of a system according to a preferred embodiment of the present invention that allows access to a software application over the World-Wide Web from a standard web browser.

Referring now to FIG. 3, a system 300 for accessing software application 342 via the WWW includes: web browser 212 running on client workstation 210; web server application 222 running on web server computer system 220; connection 216 connecting web browser 212 and web server application 222; an Internet/application gateway 332 running on a computer system 330, a connection 316 connecting web server application 222 and Internet/application gateway 332; a software application 342 running on a computer system 340; and a connection 326 connecting Internet/application gateway 332 and software application 342.

When a user wishes to access software application 342 or retrieve data under the control of software application 342, the user inputs a request from user workstation 210 by providing input to web browser 212. Web browser 212 communicates via connection 216 with web server application 222 which is running on web server computer system 220. It should be noted that Web Server Application 222 may be co-located with Web Browser 212. In addition, while not required, Computer System 330 and Computer System 340 may be the same computer system. Finally, connections 216, 316, and 326 may be any type of physical or logical means of connecting computer systems known in the art. This includes, but is not limited to, direct connections, Internet connection, Intranet connections, Infra Red (IR) and other forms of wireless connections. It is anticipated that many alternative methods and material for connecting computer systems will be readily adapted for use with the present invention. This would include those methods and materials to be developed in the future. Web server application 222 will process the request from web browser 212 and, by examining the data stream received from web browser 212, recognize that the user needs to access software application 342. Web server application 222 will then communicate with Internet/application gateway 332 which resides on computer system 330 by using communication link 316. For the discussion herein, data flowing from web browser 212 to software application 342 is considered input data, while data flowing from software application 342 to web browser 212 is considered output data. Thus, data that web browser 212 outputs to web server application 222 is web browser input data (i.e., input data from web browser 212), even though web browser 212 is outputting this data to web server application 222.

Internet/application gateway 332 acts as a translator/facilitator to allow the request from the user to be processed by software application 342. Typically, this will involve translating URLs, HTML codes, or other user-driven commands into a format or language that can be understood and processed by software application 342. Internet/application gateway 332 may provide a transparent web client interface for the user. This means that the user is unaware that they are interacting with software application 342 through Internet/application gateway 332. The interface of web browser 212 need not disclose the source of the data that is being displayed on client workstation 210. The actual processing and communicating being done by Internet/application gateway 332 may be completely hidden from the user of web browser 212. A transparent user interface can thus be implemented by embedding codes and instructions on the appropriate HTML web pages that appear on client workstation 210.

Alternatively, Internet/application gateway 332 may provide a non-transparent web client for certain users. These users would be aware that their request is being handled by a different or remote system over the WWW. This may be the case for an in-house software user who has access to a software application that is running on a remote system.

After software application 342 has performed the task requested by the user via web browser 212, the appropriate status or data corresponding to the request is returned to Internet/application gateway 332 via connection 326. Internet/application gateway 332 in turn translates the requested data or status into a form that web server application 222 can understand and transmits the requested data or status to web server application 222 using connection 316. Upon receipt, web server application 222 outputs the requested status or data into a form appropriate for web browser 212. Web browser 212 can then display the appropriate output for client workstation 210. This format would include, once again, any type of data that web browser 112 is capable of understanding (i.e., MIME, JAVA, HTML, etc.).

Figure 5:
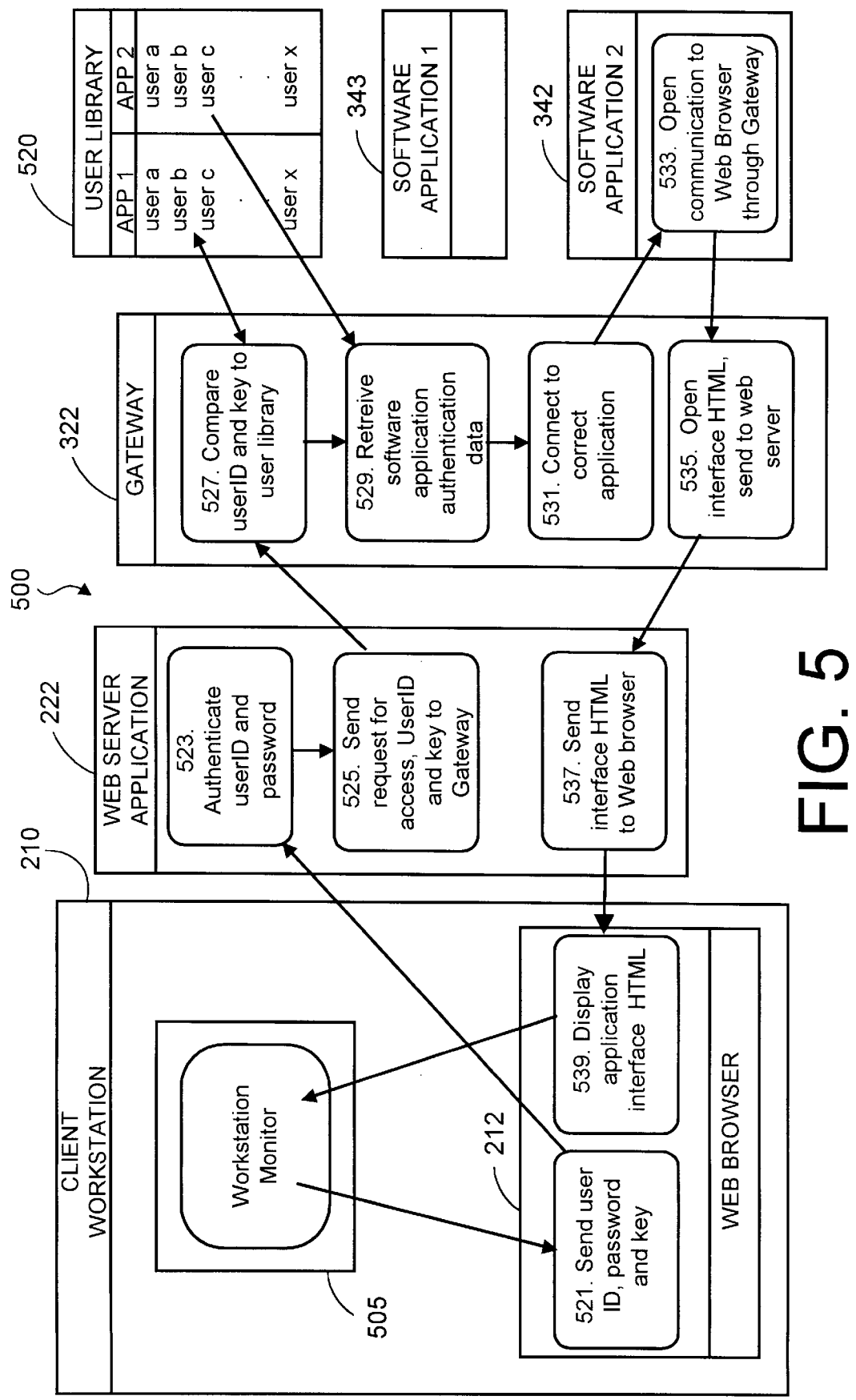
FIG. 5 is a process flow diagram of a preferred embodiment of the present invention that allows access to a software application over the World-Wide Web from a web browser.

Referring now to FIG. 5, a general method 500 of a preferred embodiment of the present invention to provide secure access to software applications via the WWW may be described in conjunction with the system of FIG. 3. In the illustrated general method, web server application 222 is used to provide secure access for a web user to software application 342 and software application 343. While the method is described with reference to access to software applications, it is equally applicable to access to other computer resources, such as databases and networks. A user at client workstation 210 performs an action that causes web browser 212 to request access to a software application via the WWW by inputting data to web server application 222. The input data may take the form of an HTML page, a URL, etc. Web browser 212 then uses standard communication protocols to pass web browser input data to web server application 222 for processing. Web server application 222 processes the request and recognizes that the user has requested access to software application 342. Web server application 222 then requests authentication data from web browser 212. This request is typically displayed as an HTML form with input blanks to enter the authentication data. After the authentication data is entered, the user submits the data back to web server 222 (step 521).

In an alternative embodiment, the authentication data is embedded into the HTML form that is sent back to the web server 222. If the key was embedded in the web browser 212 HTML form, the web server 222 parses the web browser input and retrieves the key.

According to the preferred embodiment, the authentication data includes a userID, a password and a key. The userID and password can comprise typical web-based userID and passwords. The key can comprises any set of data that serves as an identification mechanism. For the purpose of illustration, one possible key "flowmarkuser01975."

The web server uses the userID and password to authenticate the user according to standard web authentication procedures (step 523). When the user is properly authenticated by web server 222, the userID and key are passed to the gateway 332 along with the request for access to a particular software application (step 525). Any communication from web server application 222 to gateway 332 is referred to herein as web server input data.

Gateway 332 compares the userID and key to userIDs and keys stored in a user library 520 (step 527). The user library preferably stores the user information for a plurality of software applications that are to be accessed through gateway 332. The user library 520 can be structured in a wide variety of ways. For example, each software application could have the same key for all approved users. Thus, when the gateway 332 receives the key it compares users with the submitted userID in the library 520 for the application specified by the key. Alternatively, each key can unique and the gateway will search the entire library for a matching key and userID.

The user library contains the authentication data needed to access the corresponding software applications for each authorized user. Thus, the gateway retrieves the required software application authentication data (step 529). With the software authentication data, gateway 322 can create a communication connection to software application 342 (step 531). In particular, in the preferred embodiment the user library can provide the same authentication data that would normally be required for a non-web based access to each software application. Because the user library 520 stores the normal authentication data for software application, gateway 322 can use normal security procedures provided by the native interface to software application 342. A secure web connection to software application 342 can thus be provided without having to alter the native software application security system and requiring that a system administrator implement and maintain a special security system for web accesses to the software application 342.

In the illustrated example the key and userID correspond to a userID and key stored in user library 520 for software application 342. The userID and key then used to locate authentication information for the software application(s) that the user is authorized to access. If the userID and key are not found in the user library 520, the user is not authorized to access any of the resources that may be accessed through gateway 322.

The software application authentication data stored in the user library may include workgroup user names, workgroup passwords, application database identifiers, or any other information that is needed to facilitate communication with software application 342 according to the software application 342 native security system. Because this authentication data is never sent across the WWW, it is not subject to the risk of being snooped by unauthorized users.

Gateway 332 generates the appropriate commands that the software application 342 can understand and communicates the commands to software application 342, along with sufficient information to identify the process or function that software application 342 will perform to the web client that requested the process or function. Any communication from gateway 332 to software application 342 is referred to herein as software application input data. Software application 342 then processes the request on software application input data 532 and performs the necessary functions. The first step is to open a conversation with web browser 212 through gateway 322 (step 533). In the illustrated example, the conversation is opened with software application 342.

Any communication from software application 342 to gateway 332 is referred to herein as software application output data. Gateway 332 then determines from information passed with the software application output data which web client corresponds to the software application output data. Gateway 332 then determines how to act upon the software application output data, and generally opens a HTML page that will act as an interface between the software application 342 and the web browser 212 and passes the interface HTML page to web server 222 (step 535). Any communication from gateway 332 to web server application 222 is referred to herein as web server output data. Web server application 222 then provides the web server output data, for example, the interface HTML page to web browser 212 (step 537). Any communication between web server application 222 and web browser 212 is referred to herein as web browser output data. Finally, web browser 212 provides web browser output data to the user in the appropriate form (e.g., displays an HTML page on workstation monitor 505) (step 539).

Note that the connections shown in FIG. 5 are representative of different types of data flow, and do not represent physical connections. For example, web browser input data and web browser output data of FIG. 5 are both communicated via connection 216 of FIG. 3. Web server input data and web server output data are both communicated via connection 316 of FIG. 3. Software application input data and software application output data are both communicated via connection 326 of FIG. 3. Note that connections 216, 316 and 326 may be any suitable connection between computer systems and/or software applications.

FIG. 5 depicts a preferred embodiment of a method in accordance with the present invention and describes the interaction and communication between a single web browser and a software application. However, the present invention is not limited to an environment with a single user and a single web browser. As explained below with regard to FIG. 6, a multi-user system is contemplated where multiple users will use multiple web browsers to simultaneously access the same software application via the WWW. The Internet/application gateway 332 provides a mechanism to track interactions between multiple users and match the requests made to the software application by each user for the various desired transactions.

Figure 4:
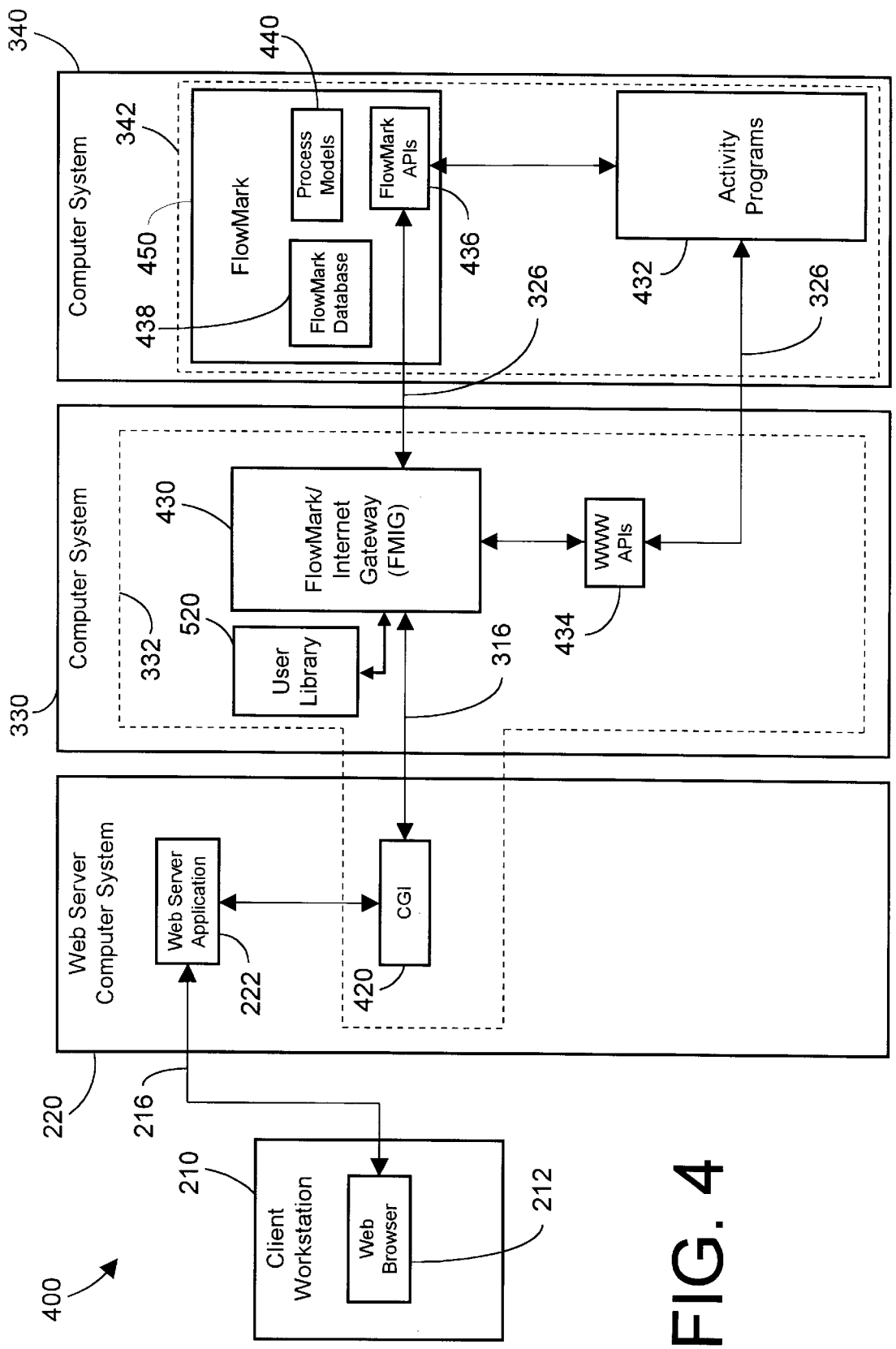
FIG. 4 is a more detailed block diagram of the system of FIG. 3, further adapted to access FlowMark workflow application software over the World-Wide Web.

Referring now to FIG. 4, a system 400 allows accessing a FlowMark workflow system over the WWW from web browser 212. In this example, software application 342 is a work flow application known as FlowMark which is programmed to perform a specific function. While this specific example uses FlowMark to describe the invention, the present invention is not limited to FlowMark. Other software applications may be used in conjunction with the present invention and it is anticipated that additional application software packages will be so used.

FlowMark is a popular process engineering tool that allows a relatively complex project or task to be broken down into a series of smaller processes or tasks. The activity to be executed by FlowMark is described by using one or more process models 440 that describe the process flow and activity. This makes FlowMark very useful for activities and transactions that can be accomplished by computer systems over communication networks. FlowMark is used to build process models 440 which describe the real life task as a series of computerized sequences. Information is processed by the FlowMark workflow software and usually involves multiple related activities. The FlowMark workflow process language models the activity and automates transactions where appropriate. Individual tasks are generated into "work lists" (i.e., electronic "to do" lists). One example of using FlowMark to accomplish a specific task will be presented in detail below.

System 400 of FIG. 4 represents one suitable detailed implementation of system 300 shown in FIG. 3. The same computer systems are present (i.e., 210, 220, 230, and 240), with web browser 212 and web server application 222 residing on client workstation 210 and web server computer system 220, respectively. System 400 of FIG. 4 is presented herein to show one specific implementation of Internet/application gateway 332 when used to communicate with FlowMark workflow software application 342.

For this specific implementation, Internet/application gateway 332 includes a Common Gateway Interface (CGI) 420, a FlowMark/Internet Gateway (FMIG) 430 and WWW Application Program Interfaces (APIs) 434. FlowMark application software 342 includes FlowMark 450, and one or more activity programs 432. FlowMark 450 includes a database 438, one or more process models 440, and FlowMark APIs 436. A specific software application 342 is implemented in system 400 by defining a process model 440 within FlowMark, and by defining activity programs 432 that perform specific tasks within process model 440. FlowMark Application Program Interfaces (APIs) 436 are standard APIs that are supplied with FlowMark 450 and provide a way for FlowMark 450 to communicate with activity programs 432 and FMIG 430. FlowMark database 438 is a general purpose database that may be used to store information relating to any process model. For example, if a process model 440 and activity programs 432 implement a rental car work flow process, FlowMark database 438 would be used to store information relating to the rental car process, such as which cars are available, etc.

The user who needs to access a FlowMark application 342 over the WWW will input a request to web browser 212 using client workstation 210. The user can enter a URL for a specific home page site or click on a button presented in an HTML-generated user interface using web browser 212. When the user "submits" the requested information, usually by clicking on a button presented on an HTML form, web server application 222 receives input data from web browser 212. This data stream may be presented to web server application 222 in many different formats, including RFC 1866 or RFC 1867 formats. These two specific formats are just examples of common data stream formats that common web browsers understand. The present invention is not limited to these formats but includes any data transmission format now known or developed in the future.

Web server application 222 will-examine the user's data stream to determine what action should be taken to fulfill the user's request. If the user-requested information requires access to FlowMark application 344 there will be a command embedded in the data stream generated from web browser 212 that directs web server application 222 to pass control to CGI 420. The call to CGI 420 may be part of the URL or, alternatively, may be embedded in the data submitted by web browser 212. Access to CGI 420 is protected to keep unauthorized users from accessing FlowMark application 342 via the WWW. In order to gain access to CGI 420, the user must be authenticated by web server application 222. When web server application 222 sees the CGI command in the data stream generated by web browser 212, it requests a password and user identification (userID) from the user via web browser application 222.

Additionally, according to the preferred embodiment the web server application 222 requires a key from web browser 212. There are two primary ways to provide and deliver a key to the web server from the web browser. First, the key can be embedded in the original HTML page that is submitted back to the web server. This is the preferred method where control of access is not a primary concern. For example, embedding the key in the HTML form would be useful if the submitted HTML form is one used by visitors or "guests" to access limited functions of the software application. By embedding the key into the form that is passed to the CGI, the gateway is told automatically to grant the user access to the software application corresponding to the "guest" key. Additionally, for this situation the userID and password could also be embedded. With the userID, password and key embedded for all in the HTML form, the required authentication is provided without the user even being aware that his or her access has been authenticated.

The key is preferably embedded by assigning a variable value that is recognized by the gateway as a key in the HTML form. When the web server 222 receives the form, passes control to CGI 420, which parses out the variable with its assigned value, then passes this information to FMIG 430. FMIG 430 compares the key value and userID with those stored in user library 520. FMIG 430 then retrieves the authentication data for the -selected software application based on the key.

In a second method for supplying the key, web server 222 sends a request for the user to input a key to web browser 212. This method requires the user to enter the value, and thus provides additional security to access the software application corresponding to the key. Typically a REALM request is issued from the web server 222 to the web browser 212. The REALM request is a well-known software security feature which requires the user to input a userID and password in order to gain access to CGI 420.

When the web browser 212 receives the request, the user must type in the userID, password and key and submit them to web server 222 to proceed. Thus, the web browser 212 stores and sends the userID, password and key to web server application 222. The web server application 222 then authenticates the user as one with access to web server 222 using the userID and password. Web server 222 stores the userID and password received from the user, and sends the userID and key to the FMIG 430 through CGI 420. FMIG 430 compares the userID and key with those in user library. If a match is found, the FMIG 430 retrieves the required authentication data from the user library corresponding to the userID and key.

In the preferred embodiment, the authentication data includes all the information normally necessary to access FlowMark though its native non-web based interface. The authentication data stored in the user library can thus include FlowMark workgroup user names, FlowMark workgroup passwords, FlowMark application database identifiers, or any other information that is needed to facilitate communication with the FlowMark application that corresponds to the submitted key. Because this authentication data is never sent across the WWW, it is not subject to the risk of being snooped.

A portion 800 of user library 400 is of a suitable format for use with FlowMark is shown in FIG. 7. For each user (e.g., user a, user b) there is a corresponding user name, password, database server identifier and database identifier that provided the needed authentication information for each listed user to access the FlowMark application 342.

Because the user library stores the normal authentication data for FlowMark, FMIG 430 can use normal security procedures when connecting to FlowMark. Thus, a secure web connection to FlowMark can be provided without having to alter the normal FlowMark security system. Thus, a system administrator does not need to implement and maintain special security system for web access to FlowMark.

Thus, with the software authentication data FMIG 430 can create a authenticate the user and create a connection to FlowMark. After the user has been authenticated, web browser application 222 passes control to CGI 420 to perform the needed operation(s). CGIs are executable programs that are well known to those skilled in the art. CGIs function to provide a mechanism for transmitting information across the WWW. CGI 420 passes information from web server application 222 to FMIG 430 in the form of commands. The commands are one-way, i.e., from CGI 420 to FMIG 430, but data and status pass in both directions. Web server application 222 invokes CGI 420, and sends the appropriate commands and data regarding the request. Although the current preferred embodiment of the invention uses the CGI post (stdin) format for data transmission from web browser 212 to CGI 420, any other data transmission formats that may be generated by web browser 212 are contemplated and are within the scope of this invention.

After receiving the data from web browser 212, CGI 420 parses the data to locate relevant information about the requested processes, including the request for access to FlowMark 342. CGI 420 then sends the user data and requests to FMIG 430 along with some control information. FMIG 430 provides a way for FlowMark application 342 to interact with a web user over the WWW. FMIG 430 directs the flow of information between CGI 420 and FlowMark application 342 and initiates FlowMark functions by using FlowMark APIs 436. For example, FMIG 430 may invoke a FlowMark API 436 to create a process instance necessary to process the request submitted by the user. Then, using a different FlowMark API 436, FMIG 430 can invoke or start this process instance. The process is governed by a process model 440, which tells FlowMark 450 which activity program 432 must be invoked to perform the desired task. Once FMIG 430 has started a FlowMark process, it waits until it receives information from FlowMark 450 via FlowMark APIs 436 or from activity programs 432 via WWW APIs 434 that the request has been processed. The command interface between FMIG 430 and FlowMark APIs 436 is one-way, i.e., FMIG 430 always invokes FlowMark APIs 436, but the data and status information flows in both directions. This is important because it allows the interface to FlowMark application 342 to remain unchanged even if the web interface is changed.

FMIG 430 will also assign a "conversation identifier" to the requests from each web client that require interaction with FlowMark. This conversation identifier uniquely marks or tags all communications that are part of this conversation. A conversation is generally commenced by invoking an OPEN application program interface (API), and is generally closed by invoking a CLOSE API. FMIG 430 uses the conversation identifier to keep track of individual requests because FMIG 430 may be working with multiple users and multiple requests from each of those users. FMIG 430 thus maintains the information necessary to control the flow of information between the various users and the process instances being processed by FlowMark.

Activity programs 432 are software modules which can be used by FlowMark to accomplish the tasks requested by the user. Individual activity programs 432 are initiated by FlowMark and then the Activity Program 432 communicates with the web client via WWW APIs 434. Each workflow process model 440 initiates the activity programs 432 necessary to accomplish the designated task. Each activity program 432 is an instance of a program that runs to accomplish the desired task, returns the requested information, and then terminates. For example, activity programs 432 may require information from the user in order to process the user's request. Activity program 432 invoke appropriate WWW APIs 434 to obtain the necessary data. In this case, FMIG 430 has data waiting to submit to activity program 432, which is the same data that CGI 420 sent earlier in the process. FMIG 430 sends this data through WWW API 434 to activity programs 432. Activity programs 432 take the appropriate steps to process the data and fill the request. Activity programs 432 communicate with the user through WWW APIs 434, FMIG 430, CGI 420 and web server application 222. Activity programs 432 will also issue commands to ensure that the user has received the requested data. After confirmation has been received, that specific instance of activity programs 432 is finished with that request and will terminate. Other instances of one or more activity programs 432 may still be active, processing other requests.

WWW APIs 434 serve to provide interaction between FMIG 430 and activity programs 432. WWW APIs 434 allow FlowMark activity programs 432 to send and receive data and status to and from web clients. It is important to note the FlowMark APIs 436 remain unchanged. This is important because FlowMark APIs are not modified to allow a web user to access FlowMark. In this sense, FlowMark is unaware that a web client is accessing it, and FlowMark operates in the same manner it would as if a dedicated application were performing the requested functions. Since the FlowMark APIs are not affected, the operation of FlowMark will remain stable regardless of the process or task the web client is requesting that FlowMark application 342 accomplish. Multiple users from multiple locations can access FlowMark via the WWW and be assured that the FlowMark interface will remain stable. In some cases, the system will present a transparent web client, which means that there will be no indication to the user that their request is being processed by FlowMark application 342.

Computer System 330 and Computer System 340 are the same computer system in the preferred embodiment. Finally, connections 216, 316, and 326 may be any type of physical or logical means of connecting computer systems known in the art. This includes, but is not limited to, direct connections, Internet connections, Intranet connections, Infra Red (IR) and other forms of wireless connections. It is anticipated that many alternative methods and material for connecting computer systems will be readily adapted for use with the present invention. In sum, while several separate computer systems are disclosed herein (e.g., FIGS. 3 and 4), a computer system in accordance with the present invention may include any number or combination of computer systems. The figures herein are shown to illustrate salient aspects of the invention, and should not be construed to limit the invention to the particular configurations illustrated herein.

Figure 6:
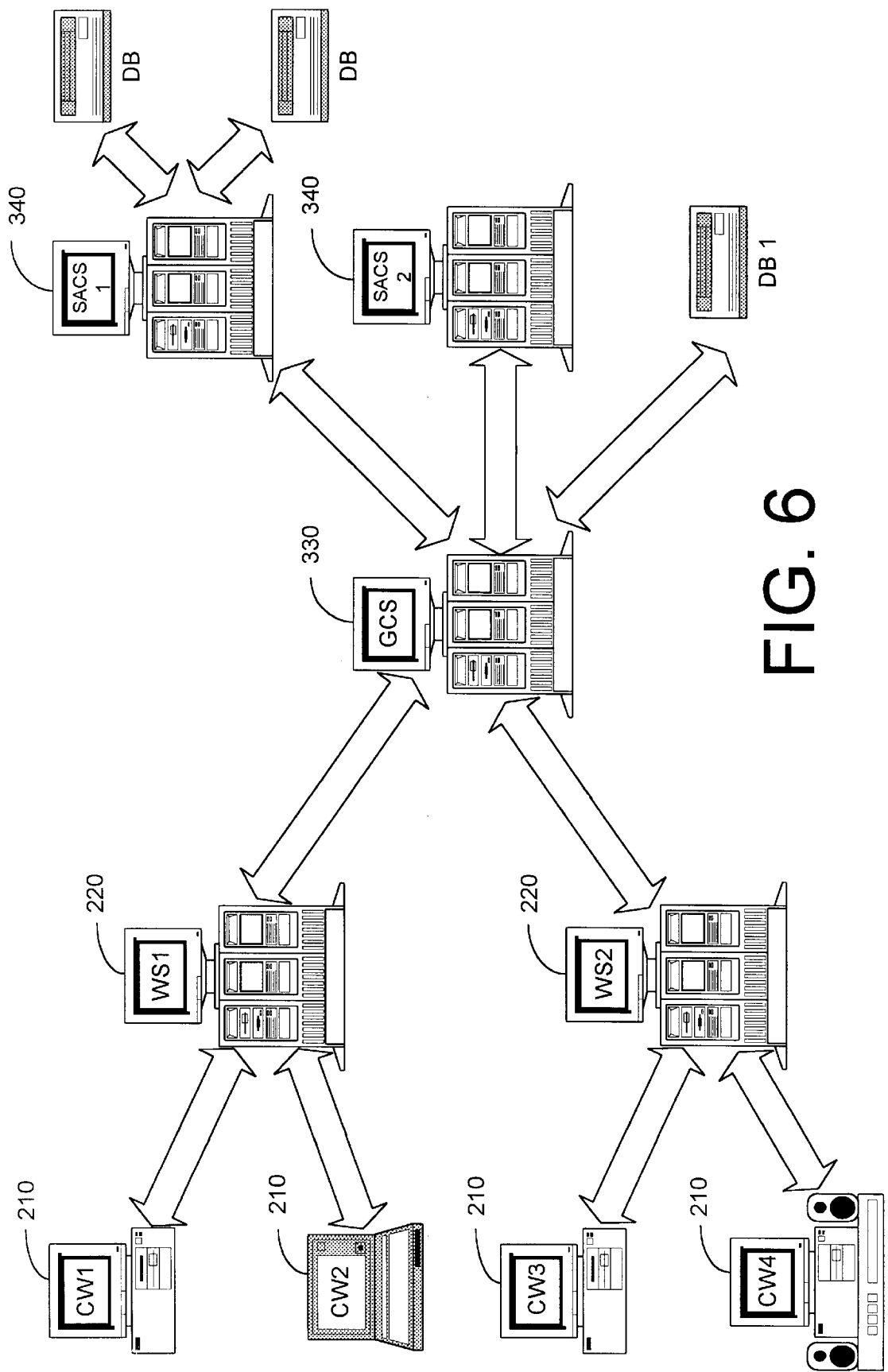
FIG. 6 is a process flow diagram of a preferred embodiment of the present invention adapted for accessing the FlowMark workflow application over the World-Wide Web.

Referring now to FIG. 6, advantages of the present invention become most apparent when multiple users are trying to access a single software application simultaneously via web browsers 212 on the WWW. Each web user will generally have a client workstation 210 that will be used to access the WWW. For the specific configuration of FIG. 6, client workstations 1 and 2 (CW1 and CW2) are coupled to web server 1 (WS1), and client workstations 3 and 4 (CW3 and CW4) are coupled to web server 2 (WS2). Both web servers WS1 and WS2 are coupled to a gateway computer system GCS. Gateway computer system is coupled to a several computer based resources, including software application computer system 1 (SACS 1), software application computer system 2 (SACs 2) and database 1 (DB1).

The present invention manages all the accesses by all these client workstations (CW1–CW4) to application software running on SACS in a manner that assures that the requested functions are performed as requested. The gateway computer system provides the application gateway that directs traffic between the web clients and the computer resources. The application requires correct userIDs and keys which are used to access authentication data for each of the computer resources. By assigning unique identifiers to each conversation between a web client and the computer resources, the gateway computer system can interact with the software application using its native interface, and can then identify output from the software application and match it with the web client that started the process that resulted in the output being generated.

Thus, the preferred embodiment of the present invention provides a apparatus and method for providing secure access to software applications over the World-Wide Web. The preferred embodiment uses a password, userID and key to access a user library. The user library provides the authentication data necessary to interface with the software applications native security systems. Thus, secure access is provided with low overhead and maintenance requirements.

While the invention has been particularly shown and described with reference to preferred embodiments thereof, it will be understood by those skilled in the art that various changes in form and details may be made therein without departing from the spirit and scope of the invention.

We claim:

1. A computer system for providing secure communication between a web browser and at least one computer resource over the World-Wide Web comprising:
   a) at least one CPU;
   b) at least one memory coupled to said at least one CPU;
   c) a security mechanism, said security mechanism residing in said memory and being executed by said at least one CPU, said security mechanism coupled to and providing an interface between said at least one computer resource and said web browser, said security mechanism receiving user input from said web browser, said security mechanism retrieving authentication parameters for said at least one computer resource corresponding to said received user input; and
   d) a web server computer system running a web server application in communication with said web browser, said web server application including a first authentication mechanism, said first authentication mechanism receiving a password and a user ID from said web browser to authenticate a user of said web browser and wherein said web server computer system further receives a key from said web browser and passes said user ID and said key to said security mechanism as said user input.

2. The computer system of claim 1 wherein said security mechanism includes:
   a gateway mechanism, said gateway mechanism coupled to and providing an interface between said computer resource and said web server application, said gateway mechanism including a second authentication mechanism, said second authentication mechanism receiving said user ID and said key from said web server application; and
   a library of computer resource users, said library of computer resource users storing authentication parameters for said at least one computer resource, wherein said gateway mechanism retrieves said authentication parameters for said at least one computer resource corresponding to said received user ID and key and delivers said authentication parameters to said at least one computer resource.

3. The computer system of claim 1 wherein the at least one computer resource comprises a process engineering software application.

4. The computer system of claim 1 wherein the at least one computer resource comprises a FlowMark software application.

5. The computer system of claim 1 wherein said authentication parameters include a password for said at least one computer resource.

6. The computer system of claim 2 wherein the gateway mechanism comprises a common gateway interface (CGI).

7. A program product for providing secure communication between a plurality of web browsers and at least one computer resource through a web server application over the World-Wide Web, wherein the web server application includes a first authentication mechanism receiving a password and user ID from said plurality of web browsers to authenticate a user of said web browsers, said web server application also receiving a key from said web browsers, the program product comprising:
   (1) a gateway mechanism, said gateway mechanism coupled to and providing an interface between said computer resource and said web server application, said gateway mechanism including a second authentication mechanism, said second authentication mechanism receiving said user ID and said key from said web server application, said gateway mechanism retrieving authentication parameters from a library of computer resource users for said at least one computer resource corresponding to said received user ID and key and delivering said authentication parameters to said at least one computer resource; and
   (2) signal bearing media bearing said gateway mechanism.

8. The program product of claim 7 wherein the signal bearing media comprises recordable media.

9. The program product of claim 7 wherein the signal bearing media comprises transmission media.

10. The program product of claim 7 wherein the at least one computer resource comprises a process engineering software application.

11. The program product of claim 7 wherein said authentication parameters include a password for said at least one computer resource.

12. The program product of claim 7 wherein the at least one computer resource comprises a FlowMark software application.

13. The program product of claim 7 further comprising a common gateway interface (CGI) that processes data received from the plurality of web browsers.

14. A computer-implemented method for securely interfacing between a web browser and a software application over the World-Wide Web, the method comprising the steps of
   providing an input from said web browser to a web server, said input including a user ID, a password and a key;
   authenticating a user of said web browser by comparing said user ID and said password to stored user IDs and stored passwords;
   delivering said user ID and said key to a gateway mechanism coupled to said web server;
   comparing said user ID and said key to a plurality of user ID's and a plurality of keys stored in a library of software application users;

retrieving authentication parameters from said stored library for accesses to said software application corresponding to said user ID and said key; and providing access to said software application using said retrieved authentication parameters.

15. The method of claim 14 wherein the software application is a process engineering software application.

16. The method of claim 14 wherein the software application is a FlowMark software application.

17. The method of claim 14 wherein said authentication parameters include a password for said software application.

18. A system for communicating between a web browser and at least one computer resource over the World-Wide Web comprising:

a client workstation running the web browser;

a web server computer running a web server application, said web server application in communication with said web browser, said web server application including a first authentication mechanism, said first authentication mechanism receiving a password and user ID from said web browser to authenticate a user of said web browser, said web server application also receiving a key from said web browser;

a first computer running a gateway mechanism, said gateway mechanism coupled to and providing an interface between said at least one computer resource and said web server application, said gateway mechanism including a second authentication mechanism, said second authentication mechanism receiving said user ID and said key from said web server application;

a second computer providing access to said at least one computer resource; and a library of computer resource users, said library of computer resource users storing authentication parameters for said at least one computer resource, wherein said gateway mechanism retrieves said authentication parameters for said at least one computer resource corresponding to said received user ID and key and delivers said authentication parameters to said at least one computer resource.

19. The system of claim 18 wherein the computer resource is a process engineering software application.

20. The system of claim 18 wherein the computer resource is a FlowMark software application.

21. The system of claim 18 wherein the web server computer comprises the first computer.

22. The system of claim 18 wherein the first computer comprises the second computer.

23. The system of claim 18 wherein the authentication parameters include a password for said at least one computer resource.

24. A program product for providing secure communication between a plurality of web browsers and at least one FlowMark software application running a plurality of Flow-Mark processes through a web server application over the World-Wide Web, wherein the web server application includes a first authentication mechanism receiving a password and user ID from said plurality of web browsers to authenticate a user of said web browsers for access to the web server application, said web server application also receiving a key from said web browsers, the program product comprising:

(1) a gateway mechanism, the gateway mechanism in communication with a web server application and the FlowMark software application, the gateway mechanism receiving FlowMark output data from the FlowMark software application and receiving FlowMark input data from the web server application, the gateway mechanism including:

an identifier mechanism generating the identifier for each conversation between one of the plurality of web browsers and a FlowMark process, said identifier used to match the FlowMark output data to one of the plurality of web browsers;

a second authenticator, said second authenticator receiving said user ID and said key from said web server;

wherein said gateway mechanism retrieves authentication parameters for the FlowMark software application corresponding to said received user ID and key from a library of computer resource users and delivers said authentication parameters to the FlowMark software application;

(2) signal bearing media bearing the gateway mechanism.

25. The program product of claim 24 wherein the signal bearing media comprises recordable media.

26. The program product of claim 24 wherein the signal bearing media comprises transmission media.

27. A method of communicating between a web browser and a FlowMark application over the World-Wide Web, the method comprising the steps of:

providing a client workstation running the web browser;

providing a web server computer running a web server application, said web server application including a authenticator;

providing a first computer system running an gateway mechanism, the gateway mechanism in communication with a library of FlowMark users, said library of FlowMark users storing authentication parameters for the FlowMark application for a plurality of FlowMark users;

providing a second computer system running the Flow-Mark application;

providing a first communication mechanism between the web browser and the web server application which allows data to be transmitted between the web browser and the web server application;

providing a second communication mechanism between the web server application and the gateway mechanism which allows data to be transmitted between the web server application and the gateway mechanism;

providing a third communication mechanism between the gateway mechanism and the FlowMark application which allows data to be transmitted between the gateway mechanism and the FlowMark application;

the web browser initiating an access to the FlowMark application by sending authentication data and environment data to the web server application via the first communication mechanism, wherein the authentication data includes a password, a user ID and a key;

the web server application determining whether the password and user ID authorizes the selected web browser to access the web server application;

the web server application processing the environment data if the password and user ID authorize the selected web browser to access the web server application;

the web server application outputting the processed environment data, the user ID and key to the gateway mechanism via the second communication mechanism;

the gateway mechanism retrieving said authentication parameters for the FlowMark application corresponding to the user ID and key;

the gateway mechanism generating an identifier corresponding to the selected web browser and a desired process to be executed by the FlowMark application;

the gateway mechanism outputting the authentication parameters, the identifier and the desired process to the FlowMark application via the third communication mechanism;

the FlowMark application executing the desired process;

the FlowMark application returning the results of executing the desired process to the gateway mechanism with the identifier via the third communication mechanism;

the gateway mechanism determining which of the plurality of browsers should be sent the results based on the identifier;

the gateway mechanism sending the results to the web server application via the second communication mechanism;

the web server application sending the results to the selected one web browser corresponding to the identifier via the first communication mechanism.

* * * * *